United States Patent
Li et al.

(10) Patent No.: US 7,580,212 B1
(45) Date of Patent: Aug. 25, 2009

(54) MAGNETIC DISK HAVING EFFICIENTLY STORED WRRO COMPENSATION VALUE REDUNDANCY INFORMATION AND METHOD FOR USING THE REDUNDANCY INFORMATION

(75) Inventors: John Yin Kwong Li, Laguna Niguel, CA (US); David Dung Tien Nguyen, Fountain Valley, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 280 days.

(21) Appl. No.: 11/393,105

(22) Filed: Mar. 30, 2006

(51) Int. Cl.
*G11B 5/09* (2006.01)
*G11B 5/596* (2006.01)
(52) U.S. Cl. .................. 360/48; 360/77.08
(58) Field of Classification Search .......... None
See application file for complete search history.

(56) References Cited

U.S. PATENT DOCUMENTS

| | | | |
|---|---|---|---|
| 6,493,173 B1 * | 12/2002 | Kim et al. ............. | 360/77.04 |
| 6,671,119 B2 * | 12/2003 | Baumann et al. ......... | 360/77.08 |
| 6,912,099 B2 * | 6/2005 | Annampedu et al. ........ | 360/39 |
| 6,972,922 B1 * | 12/2005 | Subrahmanyam et al. ...... | 360/77.04 |
| 7,027,256 B1 * | 4/2006 | Subrahmanyam et al. ...... | 360/77.08 |
| 7,193,798 B2 * | 3/2007 | Byrd et al. ............. | 360/39 |

* cited by examiner

*Primary Examiner*—Joseph H Feild
*Assistant Examiner*—Daniell L Negrón

(57) ABSTRACT

The present invention may be embodied in a magnetic disk, of a disk drive, having eight-bit fields storing wedge repeatable runout (WRRO) compensation values and redundancy information. The WRRO compensation value of each field includes a six-bit binary value of which five bits represent a compensation magnitude and one bit represents a sign bit indicating a compensation direction. The redundancy information of each field has a first bit based on the sign bit.

28 Claims, 4 Drawing Sheets

IDEAL SERVO TRACKS

WRITTEN SERVO TRACKS

MAGNETIC DISK HAVING EFFICIENTLY STORED WRRO COMPENSATION VALUE REDUNDANCY INFORMATION AND METHOD FOR USING THE REDUNDANCY INFORMATION

BACKGROUND OF THE INVENTION

1. Field of the Invention

The present invention relates to rotating magnetic disk drives, and more particularly, to a magnetic disk having efficiently stored wedge repeatable runout (WRRO) compensation values and redundancy information.

2. Description of the Prior Art and Related Information

With reference to FIGS. 6A and 6B, wedge repeatable runout (WRRO) in a disk drive results from imperfections, with respect to a perfect circle, in the location of servo information 80 along a track 82 on a disk surface in the disk drive. During track following, the WRRO imperfections have a detrimental effect on efforts by a head-position servo control loop to cause a transducer head to follow a perfect circle. The WRRO imperfections are relatively static over time and the effects of the RRO may be attenuated by measuring the WRRO and storing resulting WRRO compensation values for later use by the head-position servo loop to compensate for the WRRO.

Accordingly, there exists a need for a technique for efficiently and reliably storing the WRRO compensation values and desirable redundancy information for significantly reducing the effects of WRRO in a disk drive.

SUMMARY OF THE INVENTION

The present invention may be embodied in a magnetic disk, of a disk drive, having eight-bit fields storing wedge repeatable runout (WRRO) compensation values and redundancy information. The WRRO compensation value of each field includes a six-bit binary value of which five bits represent a compensation magnitude and one bit represents a sign bit indicating a compensation direction. The redundancy information of each field has a first bit based on the sign bit.

In more detailed features of the invention, the first bit of the redundancy information may be a duplicate, or alternatively, an inversion, of the sign bit. The one bit representing the sign bit and the first bit of the redundancy information may be stored in the respective eight-bit field with a separation of at least two bits, for example, with a separation of six bits.

In other more detailed features of the invention, the redundancy information further may include a second bit based on a most significant bit of the five bits representing the compensation magnitude. The second bit of the redundancy information may be a duplicate, or alternatively, an inversion, of the most significant bit. Also, the most significant bit and the second bit of the redundancy information may be stored in the respective eight-bit field with a separation of at least two bits, for example, with a separation of six bits.

The present invention also may be embodied in a related method for using redundancy information of wedge repeatable runout (WRRO) compensation values stored in the eight-bit fields on a magnetic disk of a disk drive. In the method, the WRRO compensation value and related redundancy information are read from an eight-bit field. The WRRO compensation value includes a six-bit binary value of which five bits represent a compensation magnitude and one bit represents a sign bit indicating a compensation direction. The redundancy information of each field has a first bit based on the sign bit. The first bit and the one bit representing the sign bit are compared, and an error in the WRRO compensation value is detected if the first bit is inconsistent with the one bit representing the sign bit.

Alternatively, the present invention may be embodied in a magnetic disk, of a disk drive, having eight-bit fields storing wedge repeatable runout (WRRO) compensation values and redundancy information. The WRRO compensation value of each field includes a six-bit binary value. The redundancy information of each field has a first bit based on a most significant bit of the six-bit binary value.

In more detailed features of the invention, the first bit of the redundancy information may be a duplicate, or alternatively, an inversion, of the most significant bit. The most significant bit and the first bit of the redundancy information may be stored in the respective eight-bit field with a separation of at least two bits, for example, with a separation of six bits.

In other more detailed features of the invention, the redundancy information further may include a second bit based on a second most significant bit of the six-bit binary value. The second bit of the redundancy information may be a duplicate, or alternatively, an inversion, of the second most significant bit. The second most significant bit and the second bit of the redundancy information may be stored in the respective eight-bit field with a separation of at least two bits, for example, with a separation of six bits.

The present invention also may be embodied in a related method for using redundancy information of wedge repeatable runout (WRRO) compensation values stored in eight-bit fields on a magnetic disk of a disk drive. In the method, the WRRO compensation value and related redundancy information are read from an eight-bit field. The WRRO compensation value includes a six-bit binary value, and the redundancy information of each field has a first bit based on a most significant bit of the six-bit binary value. The first bit and the most significant bit are compared, and an error in the WRRO compensation value is detected if the first bit is inconsistent with the most significant bit.

BRIEF DESCRIPTION OF THE DRAWINGS

The accompanying drawings illustrate embodiments of the present invention and, together with the description, serve to explain the principles of the invention.

DETAILED DESCRIPTION

Figure 1:
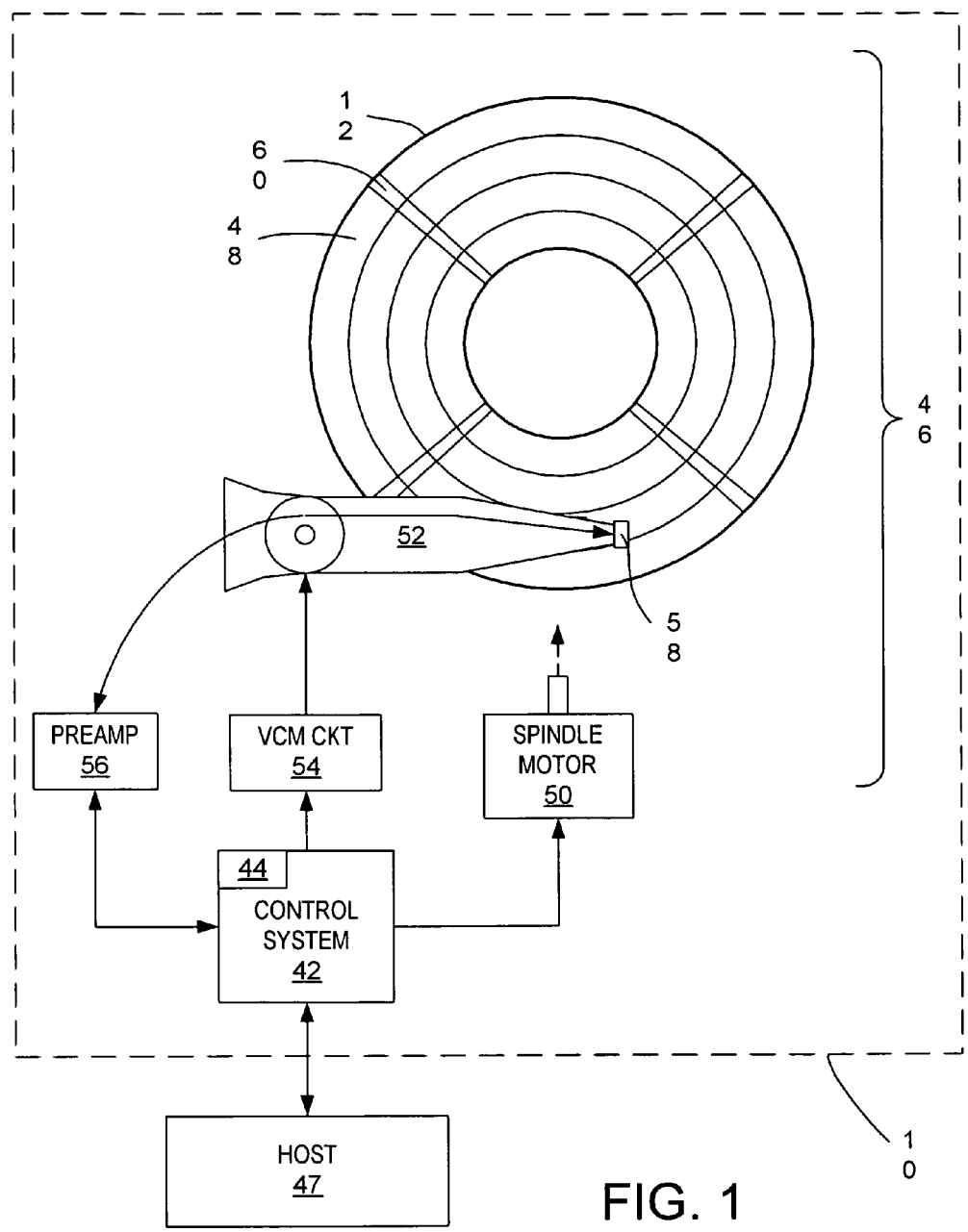
FIG. 1 is a block diagram of a computer system including a disk drive with a magnetic disk having eight-bit fields for efficiently storing wedge repeatable runout (WRRO) compensation values and redundancy information, according to the present invention.
Figure 2:
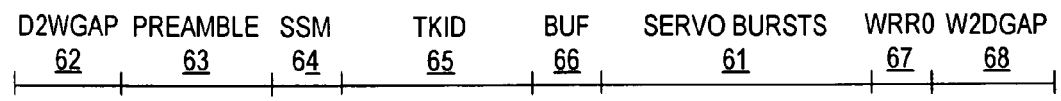
FIG. 2 is a data structure of a typical servo sector providing track identification and position information.
Figure 3:
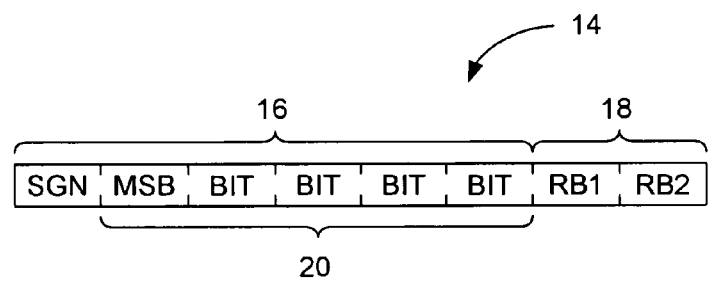
FIG. 3 is a schematic diagram of a first embodiment of an eight-bit field for storing the WRRO compensation values and redundancy information, according to the present invention.

With reference to FIGS. 1 through 3, the present invention may be embodied in a magnetic disk 12, of a disk drive 10 (FIG. 1), having eight-bit fields 14 (FIG. 2) storing wedge repeatable runout (WRRO) compensation values 16 and redundancy information 18. The WRRO compensation value of each field includes a six-bit binary value of which five bits 20 represent a compensation magnitude and one bit represents a sign bit SGN indicating a compensation direction. The redundancy information of each field has a first bit RB1 based on the sign bit.

The present invention takes advantage of one or two otherwise unused bits in an eight-bit field on the magnetic disk to provide redundancy information. If an error is detected using the redundancy information, the corresponding WRRO compensation value may be ignored or other correction may occur. Thus, the present invention may improve the performance of a disk drive.

FIG. 2 conceptually presents the servo information that may be written in a servo sector 60, but the relative dimensions of the component fields are not drawn to scale. As shown, each servo sector contains a sequence of fields having various functions relative to locating and reading the servo information and implementing the servo control process. More particularly, each servo sector generally comprises a header region (not separately identified) followed by a servo burst field 61.

The header region fields include a data-to-wedge gap (D2WGAP) (or write splice) field 62, a preamble field 63 (often having an address mark field and an automatic gain control/phase locked oscillator field), a servo sync mark (SSM) field 64, a track identification (TKID) field 65, and a buffer (BUF) field 66. The header region is followed by the servo bursts, e.g. A, B, C, and D, that are circumferentially sequential and radially offset relative to a burst pair centerline. After the servo field 61 is a WRRO field 67, and a wedge-to-data gap (W2DGAP) field 68. The WRRO field corresponds to the respective eight-bit field 14 that stores the WRRO compensation value 16 and the redundancy information 18.

The first bit RB1 of the redundancy information 18 may be a duplicate, or alternatively, an inversion, of the sign bit SGN. The one bit representing the sign bit and the first bit of the redundancy information may be stored in the respective eight-bit field with a separation of at least two bits, for example, with a separation of six bits. A separation of six bits provides redundancy protection that is better than placing the redundant bit adjacent to or only one bit from the sign bit.

The redundancy information 18 further may include a second bit RB2 based on a most significant bit MSB of the five bits 20 representing the compensation magnitude. The second bit of the redundancy information may be a duplicate, or alternatively, an inversion, of the most significant bit. Also, the most significant bit and the second bit of the redundancy information may be stored in the respective eight-bit field with a separation of at least two bits, for example, with a separation of six bits.

The present invention also may be embodied in a related method 30 (FIG. 4) for using redundancy information 18 of wedge repeatable runout (WRRO) compensation values 16 stored in the eight-bit fields 14 on the magnetic disk 12 of the disk drive 10. In the method, the WRRO compensation value 16 and related redundancy information 18 are read from an eight-bit field (step 32). The WRRO compensation value includes the six-bit binary value 16 of which five bits 20 represent a compensation magnitude and one bit represents a sign bit SGN indicating a compensation direction. The redundancy information 18 of each field has a first bit RB1 based on the sign bit. The first bit and the one bit representing the sign bit are compared (step 34), and an error in the WRRO compensation value is detected if the first bit is inconsistent with the one bit representing the sign bit (step 36).

Figure 5:
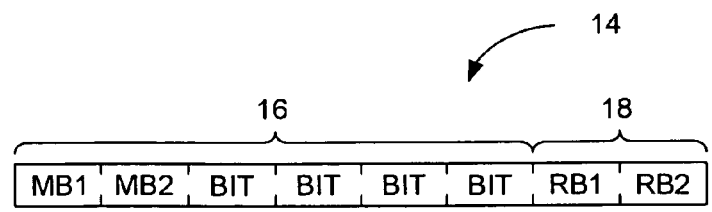
FIG. 5 is a schematic diagram of a second embodiment of an eight-bit field for storing the WRRO compensation values and redundancy information, according to the present invention.

Alternatively, the present invention may be embodied in a magnetic disk 12, of a disk drive 10 (FIG. 1), having eight-bit fields 14 (FIG. 5) storing wedge repeatable runout (WRRO) compensation values 16 and redundancy information 18. The WRRO compensation value of each field includes a six-bit binary value. The redundancy information of each field has a first bit RB1 based on a most significant bit MB1 of the six-bit binary value.

The first bit RB1 of the redundancy information 18 may be a duplicate, or alternatively, an inversion, of the most significant bit MB1. The most significant bit MB1 and the first bit RB1 of the redundancy information may be stored in the respective eight-bit field 14 with a separation of at least two bits, for example, with a separation of six bits.

The redundancy information 18 further may include a second bit RB2 based on a second most significant bit MB2 of the six-bit binary value. The second bit of the redundancy information may be a duplicate, or alternatively, an inversion, of the second most significant bit. The second most significant bit and the second bit of the redundancy information may be stored in the respective eight-bit field with a separation of at least two bits, for example, with a separation of six bits.

Figure 4:
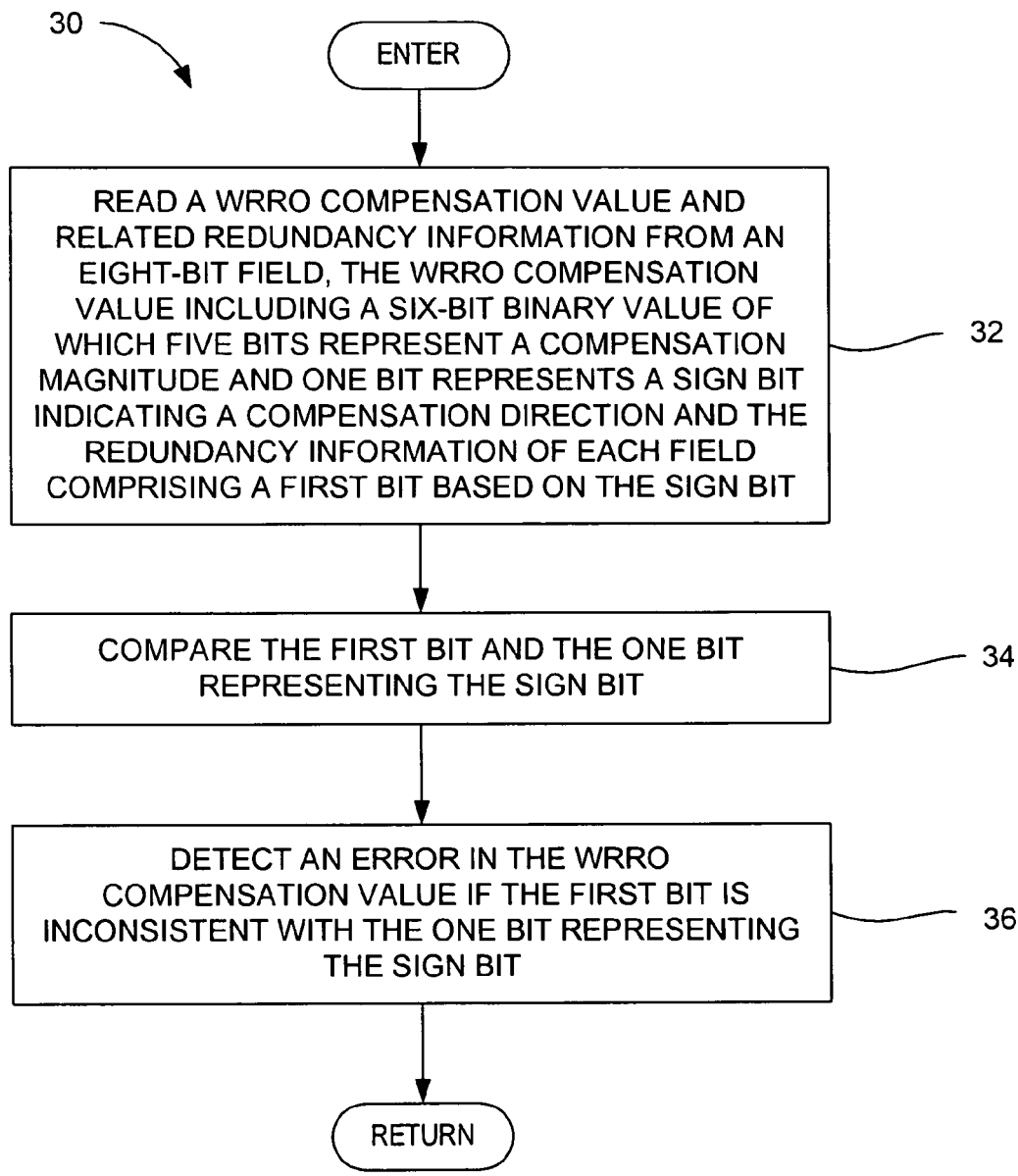
FIG. 4 is a flow diagram illustrating an embodiment of a method for using the redundancy information of the eight-bit fields, according to the present invention.
Figure 6A:
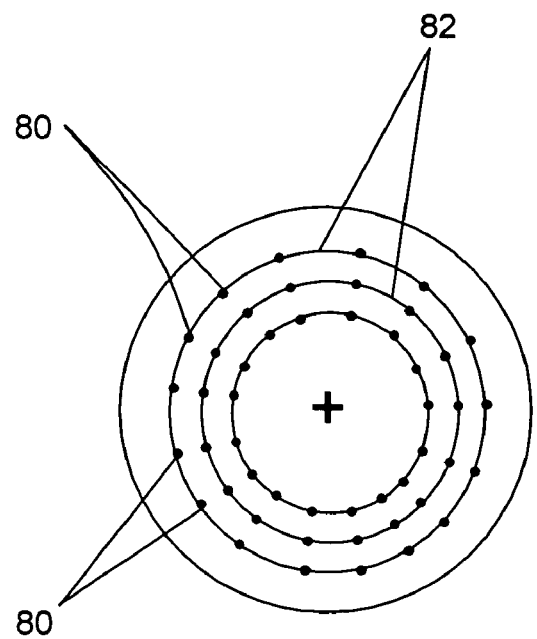
FIG. 6A is a schematic diagram illustrating ideal servo tracks on a disk of a disk drive.
Figure 6B:
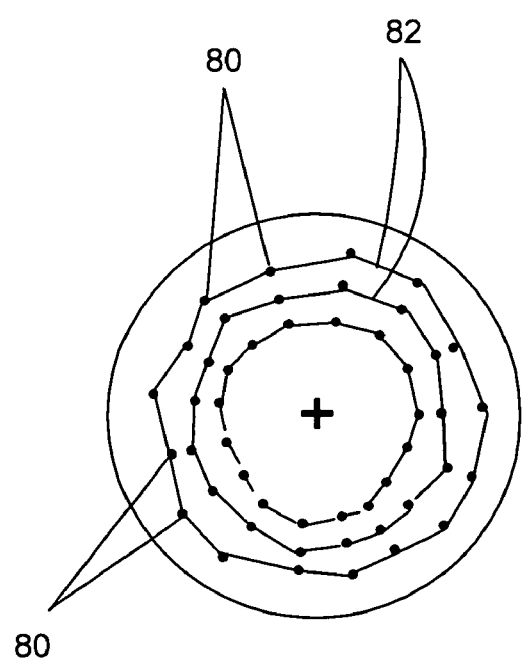
FIG. 6B is a schematic diagram illustrating written servo tracks exhibiting WRRO.

The present invention also may be embodied in a related method, similar to the method in FIG. 4, for using redundancy information 18 of wedge repeatable runout (WRRO) compensation values 16 stored in eight-bit fields 14 on a magnetic disk 12 of a disk drive 10. In the method, the WRRO compensation value and related redundancy information are read from an eight-bit field. The WRRO compensation value includes a six-bit binary value, and the redundancy information of each field has a first bit RB1 based on a most significant bit MB1 of the six-bit binary value. The first bit and the most significant bit are compared, and an error in the WRRO compensation value is detected if the first bit is inconsistent with the most significant bit.

With reference again to FIG. 1, the disk drive 10 further has a control system 42. The control system includes a sampled servo controller 44, and circuitry and processors that control a head-disk assembly (HDA) 46 and that provide an intelligent interface between a host 47 and the HDA for execution of read and write commands. The HDA includes the magnetic disk 12 having a plurality of concentric data tracks 48 recorded thereon. The control system may have an internal microprocessor and nonvolatile memory for implementing the techniques related to the invention. Program code for implementing these techniques may be stored in the nonvolatile memory and transferred to volatile random access memory (RAM) for execution by the microprocessor. The microprocessor and the supporting hardware of the disk drive comprise the means for implementing the functions of the disk drive. The HDA further includes a spindle motor 50, an actuator 52, a voice coil motor (VCM) circuit 54 coupled between the actuator and the sampled servo controller of the control system, and a preamplifier 56 coupled between the control system and a transducer head 58 on the actuator.

The magnetic media surface of the disk 12 is accessed using the head 58. The tracks 48 on the media surface may be divided into storage segments. Each storage segment typically begins with a servo sector which is followed by data sectors. The servo sector 60 for a storage segment corresponds to an intersection with the radially-extending embedded servo wedges. The data sectors may include data blocks, each generally storing 512 data bytes. Each data block may be addressed using a logical block address (LBA).

The servo controller 44 implements a servo control loop which causes the transducer head 58 to follow a desired path (or centerline) of the selected track 48 in an operation generally referred to as "track following." During track following, the path of the head wanders about the desired track path. The sampled servo controller 44 reads track identification information and track position information from a servo sector 60 and uses that information to generate head position control signals for the VCM circuit 54. Typically, the servo controller attempts to limit the head wander to within a predetermined range defined by a "Track Misregistration" (TMR) budget. A position error signal PES is generated during track following, and the RRO compensation values 16 are used to modify the PES to reduce the effects of the WRRO during track following operations. Redundancy of the sign bit SGN and/or the most significant bits MSB, MB1 and MB2, is particularly advantageous because an error in these bits has the greatest detrimental effects on track following operations.

We claim:

1. A disk drive, comprising
   a head magnetically coupled to a magnetic disk, wherein the magnetic disk comprises eight-bit fields storing wedge repeatable runout (WRRO) compensation values and redundancy information, the WRRO compensation value of each field including a six-bit binary value of which five bits represent a compensation magnitude and one bit represents a sign bit indicating a compensation direction, and the redundancy information of each field comprising a first bit based on the sign bit of the six-bit binary value of the same field; and
   a servo control system to read the eight-bit fields from the magnetic disk and to compare the first bit to the sign bit to detect an error in the WRRO compensation value if the first bit is inconsistent with the one bit representing the sign bit.

2. A disk drive as defined in claim 1, wherein the first bit of the redundancy information is a duplicate of the sign bit.

3. A disk drive as defined in claim 1, wherein the first bit of the redundancy information is an inversion of the sign bit.

4. A disk drive as defined in claim 1, wherein the one bit representing the sign bit and the first bit of the redundancy information are stored in the respective eight-bit field with a separation of at least two bits.

5. A disk drive as defined in claim 1, wherein the redundancy information further comprises a second bit based on a most significant bit of the five bits representing the compensation magnitude.

6. A disk drive as defined in claim 5, wherein the most significant bit and the second bit of the redundancy information are stored in the respective eight-bit field with a separation of at least two bits.

7. A disk drive as defined in claim 5, wherein the first bit of the redundancy information is an inversion of the sign bit, and the second bit of the redundancy information is an inversion of the most significant bit.

8. A method for using redundancy information of wedge repeatable runout (WRRO) compensation values stored in eight-bit fields on a magnetic disk of a disk drive, the method comprising:
   reading the WRRO compensation value and related redundancy information from an eight-bit field, the WRRO compensation value including a six-bit binary value of which five bits represent a compensation magnitude and one bit represents a sign bit indicating a compensation direction and the redundancy information of each field comprising a first bit based on the sign bit of the six-bit binary value of the same field;
   comparing the first bit and the one bit representing the sign bit;
   detecting an error in the WRRO compensation value if the first bit is inconsistent with the one bit representing the sign bit.

9. A method for using redundancy information as defined in claim 8, wherein the one bit representing the sign bit and the first bit of the redundancy information are stored in the respective eight-bit field with a separation of at least two bits.

10. A method for using redundancy information as defined in claim 8, wherein the redundancy information further comprises a second bit based on a most significant bit of the five bits representing the compensation magnitude.

11. A method for using redundancy information as defined in claim 10, wherein the most significant bit and the second bit of the redundancy information are stored in the respective eight-bit field with a separation of at least two bits.

12. A method for using redundancy information as defined in claim 10, wherein the first bit of the redundancy information is an inversion of the sign bit, and the second bit of the redundancy information is an inversion of the most significant bit.

13. A disk drive, comprising
    a head magnetically coupled to a magnetic disk, wherein the magnetic disk comprises eight-bit fields storing wedge repeatable runout (WRRO) compensation values and redundancy information, the WRRO compensation value of each field comprising an six-bit binary value, and the redundancy information of each field comprising a first bit based on a most significant bit of the six-bit binary value of the six-bit binary value of the same field; and
    a servo control system to read the eight-bit fields from the magnetic disk to compare the first bit and the most significant bit to detect an error in the WRRO compensation value if the first bit is inconsistent with the most significant bit.

14. A disk drive as defined in claim 13, wherein the most significant bit and the first bit of the redundancy information are stored in the respective eight-bit field with a separation of at least two bits.

15. A disk drive as defined in claim 13, wherein the redundancy information further comprises a second bit based on a second most significant bit of the six-bit binary value.

16. A disk drive as defined in claim 15, wherein the second most significant bit and the second bit of the redundancy information are stored in the respective eight-bit field with a separation of at least two bits.

17. A disk drive as defined in claim 15, wherein the first bit of the redundancy information is an inversion of the most significant bit, and the second bit of the redundancy information is an inversion of the second most significant bit.

18. A method for using redundancy information of wedge repeatable runout (WRRO) compensation values stored in eight-bit fields on a magnetic disk of a disk drive, the method comprising:
    reading the WRRO compensation value and related redundancy information from a field, the WRRO compensation value including a six-bit binary value, and the redundancy information of each field comprising a first bit based on a most significant bit of the six-bit binary value of the same field;

comparing the first bit and the most significant bit; and detecting an error in the WRRO compensation value if the first bit is inconsistent with the most significant bit.

19. A method for using redundancy information as defined in claim 18, wherein the first bit of the redundancy information is a duplicate of the most significant bit.

20. A method for using redundancy information as defined in claim 18, wherein the first bit of the redundancy information is an inversion of the most significant bit.

21. A method for using redundancy information as defined in claim 18, wherein the most significant bit and the first bit of the redundancy information are stored in the respective eight-bit field with a separation of at least two bits.

22. A method for using redundancy information as defined in claim 18, wherein the redundancy information further comprises a second bit based on a second most significant bit of the six-bit binary value.

23. A method for using redundancy information as defined in claim 22, wherein the second most significant bit and the second bit of the redundancy information are stored in the respective eight-bit field with a separation of at least two bits.

24. A method for using redundancy information as defined in claim 22, wherein the first bit of the redundancy information is an inversion of the most significant bit, and the second bit of the redundancy information is an inversion of the second most significant bit.

25. A method for using redundancy information of wedge repeatable runout (WRRO) compensation values stored on a magnetic disk of a disk drive, comprising:

reading a WRRO field on the magnetic disk, the WRRO field comprising a WRRO compensation value including a plurality of binary values and a WRRO compensation redundancy value comprising a first bit based on a portion of the WRRO compensation value of the same field;

comparing the portion of the WRRO compensation value and the first bit of the WRRO compensation redundancy value; and detecting an error in the WRRO compensation value if the first bit is inconsistent with the portion of the WRRO compensation value.

26. The method as in claim 25, wherein the first bit is based on the most significant bit of the WRRO compensation value.

27. The method as in claim 25, wherein the first bit is based on a sign bit of the WRRO compensation value.

28. The method as in claim 27, wherein the WRRO compensation redundancy value further comprises a second bit wherein the second bit is based on the most significant bit of the WRRO compensation value.

* * * * *